Oct. 3, 1961    F. F. GUNTHER    3,002,533
VALVED URN SHANK
Filed Aug. 13, 1958    2 Sheets-Sheet 1
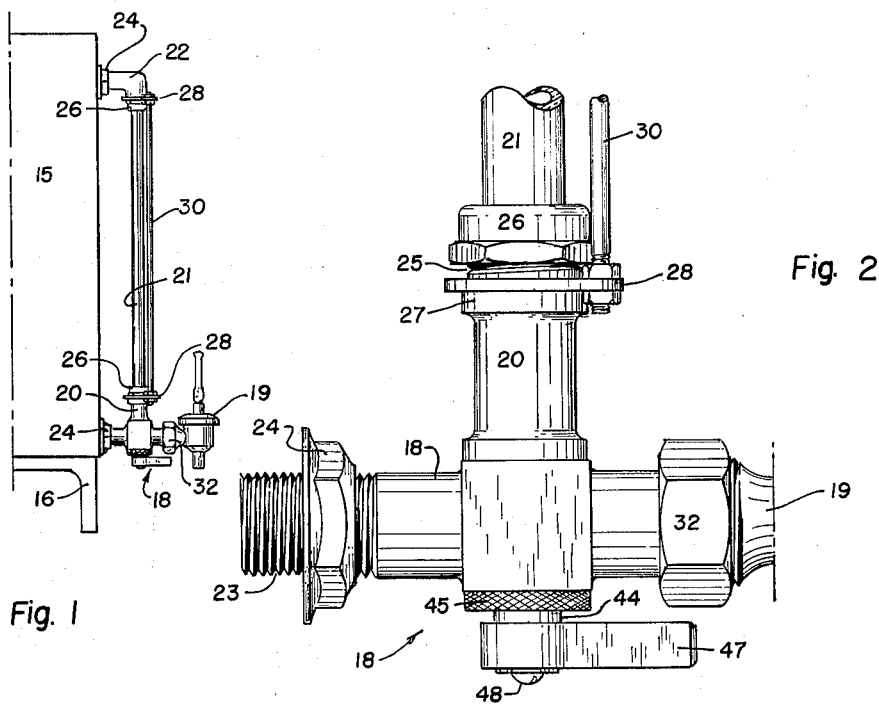
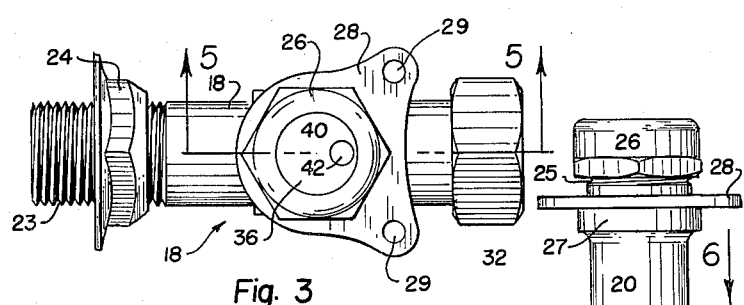
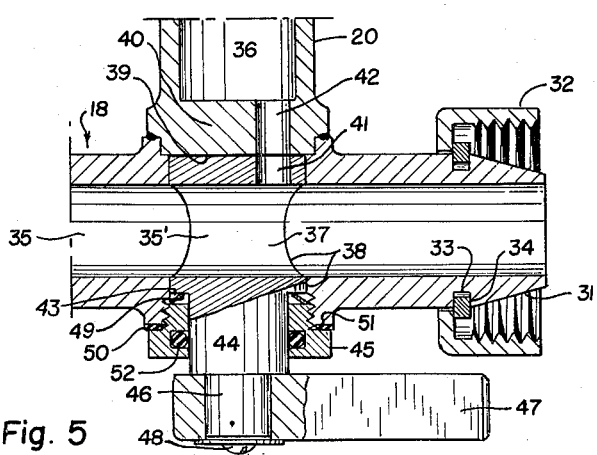
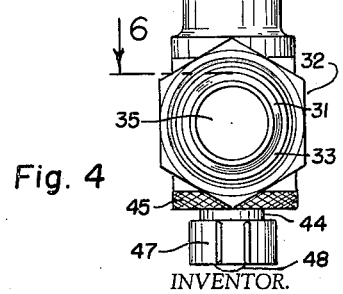
INVENTOR.
Frederick F. Gunther
BY WHITEHEAD, VOGL, & LOWE
PER Frank C. Lowe
ATTORNEYS

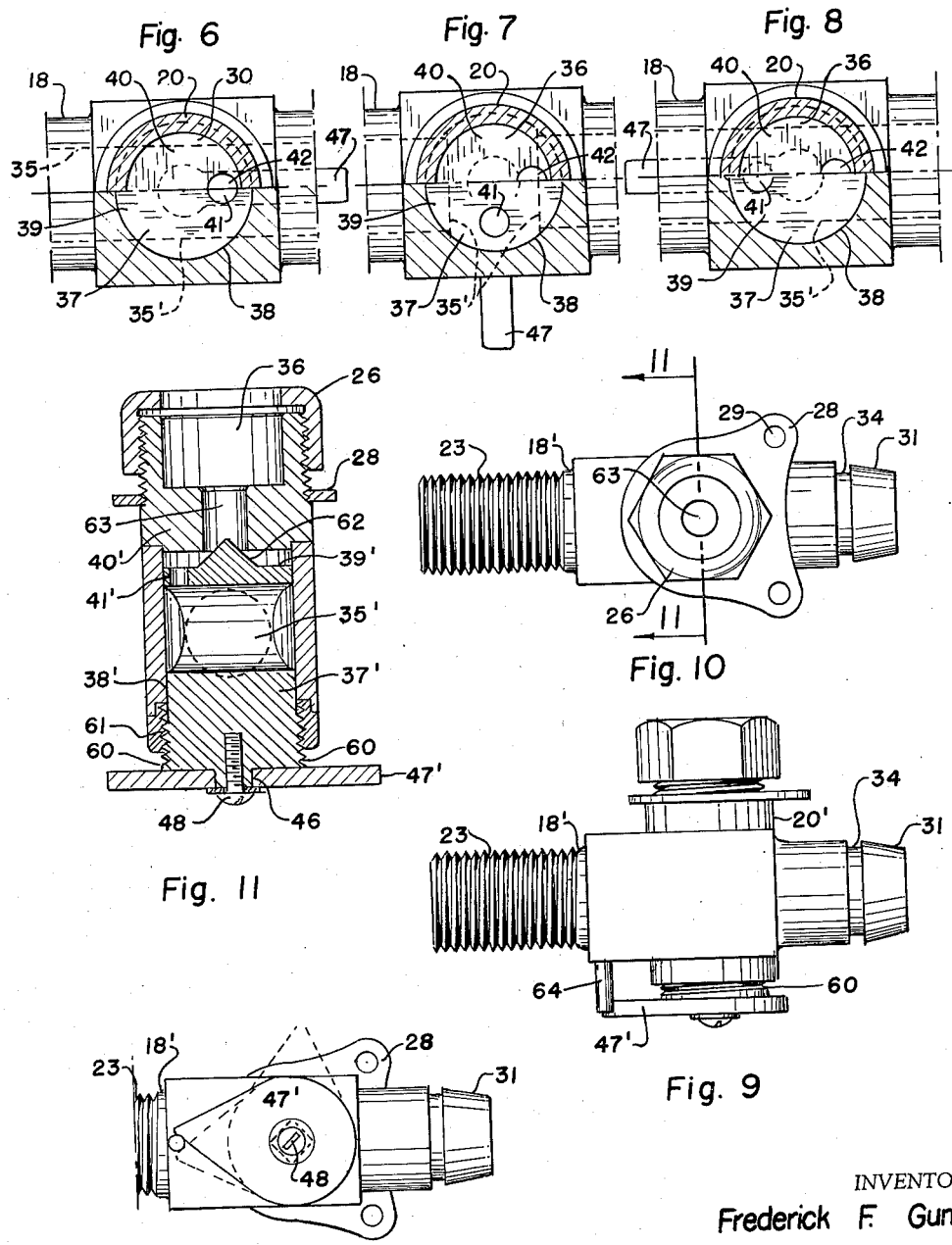

United States Patent Office 3,002,533
Patented Oct. 3, 1961

3,002,533
VALVED URN SHANK
Frederick F. Gunther, Cheyenne, Wyo., assignor to Wyott Manufacturing Company, Inc., Cheyenne, Wyo., a corporation of Wyoming
Filed Aug. 13, 1958, Ser. No. 754,868
4 Claims. (Cl. 137—625.47)

This invention relates to fittings for liquid dispensing apparatus and more particularly to fittings for holding faucets and glass gages in beverage dispensing urns.

A very common type of urn which is widely used for dispensing coffee is constructed in the general form of a vertical-walled, open top kettle having a faucet or spigot at its base to drain the contents of the urn. In such an urn it is customary to include also a vertical glass gage outside the body of the urn to indicate the liquid level of its contents. A common construction for such a gage includes fittings which interconnect the glass gage and the outlet faucet at the side of the urn. Such fittings ordinarily include a shank which extends from the urn in the form of an inverted T with the central leg of the T extending upwardly for connection with the glass gage and with the faucet being attached to an outstanding arm of the T.

It follows that a primary object of the invention is to provide a novel and improved connecting shank for an urn which is adapted to be affixed in the base of the urn to hold the glass gage and a faucet.

Other objects of the invention are to provide a novel and improved urn shank for holding a glass gage and a faucet at the base of an urn, which: (a) incorporates within its body a valved arrangement for the regulation of movement of liquid therethrough; (b) incorporates within its body a valving arrangement for supplemental regulation of liquid flow from the urn to the faucet and glass gage, and acts as an emergency shutoff; (c) permits a shutoff of the flow into the glass gage without disturbing the flow through the faucet, thereby permitting continued use of the faucet should the glass gage be accidentally broken; (d) permits removal of either the faucet or the glass gage, or both, as for cleaning or replacement without the need for draining the contents of the urn.

Yet other objects of the invention are to provide a novel and improved valved urn shank for connection with a faucet and glass gage, which is of exceedingly simple construction, neat appearing, easy to use, easy to clean and maintain, adapted for connection with various types of urns and which is a low cost, rugged and durable unit.

With the foregoing and other objects in view, all of which more fully hereinafter appear, my invention comprises certain novel and improved constructions, combinations and arrangements of parts and elements as hereinafter described, defined in the appended claims and illustrated, in preferred embodiments, in the accompanying drawing in which:

FIGURE 1 is a side elevation view of the front portion of an urn illustrating a glass gage and faucet mounted thereon in conventional manner but with the improved urn shank constituting one of elements of the assembly.

FIGURE 2 is a great enlarged fragmentary side elevation view of that portion of the assembly shown at FIG. 1 which includes the urn shank and fragments of interconnecting elements associated therewith.

FIGURE 3 is a plan view of the urn shank per se.

FIGURE 4 is an end view of the urn shank per se.

FIGURE 5 is a sectional elevation view of a portion of the shank, as taken substantially from the indicated line 5—5 at FIG. 3, but on an enlarged scale.

FIGURE 6 is a fragmentary sectional plan view as taken from the indicated line 6—6 at FIG. 4, but on an enlarged scale, and with broken lines indicating elements and constructions hidden from view.

FIGURES 7 and 8 are similar to FIG. 6 but illustrate alternate positions of the movable elements within the unit.

FIGURE 9 is a side elevation view of a shank similar to the showing at FIG. 2, but illustrating another embodiment of the invention.

FIGURE 10 is a plan view of the unit illustrated at FIG. 9.

FIGURE 11 is a transverse sectional elevation view as taken from the indicated line 11—11 at FIG. 9 but on an enlarged scale and with movable elements in an alternate position from that shown at FIG. 9.

FIGURE 12 is a bottom view of the FIG. 9 unit with broken lines indicating alternate positions of the controls therein.

Referring more particularly to the drawing, FIG. 1 illustrates a common type of urn which is used for the dispensing of coffee and like fluids. The urn 15 is formed as an open-top, kettle-like container having vertical walls. It may vary in height, common units being from 18 to 36 inches high. It is also conveniently mounted upon a base 16 or like structure in order to provide sufficient clearance to drain the contents of the urn as into a cup which must be set below the urn.

The contents of the urn are normally drained therefrom through a passageway at the base of the urn, not shown, which is threaded to receive the arm of a shank 18 and a faucet 19 is attached to this shank 18. The faucet 19 is preferably a quick-opening, quick-closing type which may be easily taken apart and cleaned and the flow from the urn is regulated with this faucet.

In addition to the faucet, the common type of urn 15 in use will include a glass gage or other fluid-level indicating gage. In ordinary construction the shank 18 is formed as an inverted T-type fitting, with the upturned central T-leg 20 being adapted to hold a glass tube forming the glass gage 21. The glass gage 21 extends upwardly to the top of the urn and there it is connected to the urn by an L-type angle-fitting 22, which is mounted in the face of the urn in a manner similar to the shank mounting 18. With this arrangement the liquid level in the urn is quickly and accurately indicated at all times.

Various conventional fittings are associated with the urn shank 18 and the angle-fitting 22 to hold and protect the glass gage. One arm of the shank 18 and of the angle fitting 22 is threaded as at 23, to fit into the urn 15 in suitable threaded openings, not shown. These threads may be tapered as are common pipe threads, to provide for a leak-proof fit, or they may be parallel threads and a washer used for sealing fit. In the latter instance, the threads are turned on the shank arm or angle-fitting arm a sufficient distance to hold a lock nut 24 which may bear against a washer, not shown.

The upstanding T-leg 20 of the shank 18 and the downturned leg of the angle-fitting 22 are formed with an internal diameter sufficient to receive the ends of the tubular glass gage 21. The end of the T-leg 20 and angle-fitting 22 are suitably threaded as at 25 to receive a packing nut 26 for holding the glass gage in place, it being contemplated that suitable washers, not shown, will be placed within the packing nuts 26 to rest upon the end of the T-leg 20 and angle fitting leg to effect a tight leak-proof seal at each end of the glass gage 21. The T-leg 20 and opposing leg of the angle fitting 22 are each provided with a shoulder 27 at the base of the threads 25 to hold a rod plate, threaded thereon, transversely to the axis of the glass gage. This rod plate 28 includes a pair of outstanding ears having orifices 29 therein adapted to receive the ends of protective rods 30 which extend between the plates 29 to lie in front of the glass gage 21.

The urn shank 18 is designed to outstand from the urn with one arm extending beyond the central T-leg 20 and the faucet 19 is connected to this extended arm. In preferred construction, the arm terminates as a suitable peripheral taper seal 31 which extends into the inlet of the faucet 19. The ordinary faucet inlet is formed with external threads and a lock nut 32 is slideably carried upon the body of the shank 18, and is adapted to be turned onto the faucet inlet threads when the faucet is mounted upon the seal 31. The lock nut is held in place upon the shank leg 18 as by a lock washer 33 in a peripheral groove 34 at the base of the seal 31, as clearly illustrated at FIG. 3.

The structure of the urn shank 18 thus far described is generally conventional and it is to be understood that the connections to the urn, to the glass gage and to the faucet may be varied from those above-described, without modifying the arrangements constituting the invention, as hereinafter described in detail.

Referring more particularly to the construction of the urn shank 18, the shank may best be described as an inverted T fitting, with the horizontally disposed arms and the upstanding central T-leg 20, which carries the glass gage. A cylindrical passageway 35 extends through the arms of the shank and in conventional construction a passageway 36 in the T-leg 20 connects with the arm passageway so that there is an open bifurcated passageway from the urn 15 to the faucet 19 and to the glass gage. In the improved unit however, this bifurcated arrangement of passageways 35 and 36 is valved to cut off the respective passageways from each other.

In the construction illustrated at FIGS. 1 to 8 a plug valve 37 traverses the shank passageway 35, being set and snugly fit into a cylindrical socket 38 which is aligned on a common axis with the passageway 36 in the leg 20. This plug 37 and socket 38 are of a sufficient diameter to permit a passageway orifice 35' in the plug, having the same diameter as the shank passageway 35, to extend therethrough in alignment with the passageway 35 when the plug 37 is in its full open position.

This plug valve 37 is formed with a flat top surface 39, normal to the plug valve axis, which abuts snugly against an opposing flat under-surface of a transverse block 40 at the base of the glass gage passageway 36 in the leg 20. This under-surface of the block 40 is appropriately the bottom of the socket 38. Communication of the passageway 36 with the passageway 35 is through an orifice 41 in the top of the plug valve 37 and an orifice 42 in the block. These orifices lie in mutual registration when the valve 37 is open. However, they are offset from the plug valve axis, and rotation of the plug valve from the open position offsets the passageways 41 and 42 to break communication between the passageways 35 and 36, thereby closing the glass gage passageway from the shank passageway.

The plug valve 37 extends into and fills the socket 38 at the passageway 35, but it is reduced in diameter at a shoulder 43 below the pasageway with a smaller diameter stub 44 extending below and from the underside of the shank 18 opposite the leg 20. A packing-gland nut 45 is threaded into the socket 38 at the underside of the shank and the stub 44 extends through this gland nut 45. Beyond the gland nut 45 the stub 44 is reduced in diameter to form a second stub 46 which holds a handle 47 which is affixed in position on the stub as by a washer nut 48.

The gland nut 45 is knurled so that it may be easily turned and tightened in the threaded portion of the socket 38 with its end pressing against a spring 49, which in turn presses against the shoulder 43 to hold the plug valve 37 in position with the top surface 39 being held tightly against the underside of the block 40. When completely turned into the socket 38, the gland nut 45 bears against an annular flat gasket 50 at a shoulder 51 at the underside of the shank body 18 about the socket 38. An O-ring gasket 52 is fitted into a suitable annular pocket 53 within the gland nut 45 to embrace the stub 44. The gasket 50 and O-ring 53 thereby provide for a fluid-tight seal and prevent leaks at the shank.

The operation of this unit is illustrated at FIGS. 6, 7 and 8 in a diagrammatic manner. When the plug valve 37 is aligned in the socket with the passageway orifice 35' in registration with the passageway 35 and the plug orifice 41 in registration with the block orifice 42, as clearly illustrated at FIG. 6, the urn shank is in a fully open position and fluid is free to flow into the glass gage through the passageway 36 to indicate the contents in the urn 15. This is the full open valve position for normal use of the unit.

However, when the handle 47 is turned at 90 degrees from the full open position, as illustrated at FIG. 7, both the passageway 35' in the plug 37 and the plug orifice 41 are moved out of registration with their respective communicating passageways and the shank is completely closed. When so closed, both the faucet 19 and the glass gage 21 can be removed from the urn without disturbing the fluid content in the urn. This full off valve position is desirable for maintenance and cleaning of the faucet and glass gage.

Whenever the handle 47 is turned 180 degrees from the full open position, as illustrated at FIG. 8, the passageway 35' in the plug 37 again registers with the shank passageway 35 being then open to permit movement of fluid therethrough. However, the orifice 41 does not register with orifice 42 and fluid cannot move from the shank passageway 35 to the glass gage 21 through passageway 36. When so closed, the faucet 19 may be used but at the same time, the glass gage may be removed, as for cleaning without disturbing the faucet 19 to drain the urn contents. The advantage of this construction becomes apparent when it is realized that glass gages may be broken, or leak at their connections, or develop other troubles while the urn 15 is still partially full of liquid. In conventional arrangement if a glass gage is broken the contents of the urn are lost.

The embodiment illustrated at FIGS. 9 through 12 is similar in use and function to the aforegoing described construction, however, the elements which seal off the glass gage retaining passageway 36 from the shank passageway 35 are modified. In this modified construction, the urn shank 18' is illustrated as being a more compact unit. However, the unit includes threads 23 at one arm for attachment to an urn and a taper seal 31 at the other arm for holding a faucet 19 as hereinbefore described. The T-leg 20' is shortened but it includes a glass gage retaining passageway 36, a packing nut 26 and rod plate 28 as hereinbefore described.

The plug valve 37' is modified by including a threaded segment 60 at its base which snugly fits into a threaded head 61 depending from the underside of the shank 18' at the modified socket 38' so that the valve 37' will move into the socket 38' as it is rotated. The passageway between the urn shank passageway 35 and the glass gage passageway 36 is likewise modified. The top 39' of the plug valve 37' is formed with a central upstanding cone 62 which is aligned with a central orifice 63 in the modified block 40'. An orifice 41' is located in the plug to one side of the needle 62 and movement of fluid is from passageway 35 through orifice 41' and thence through the central orifice 63 to the passageway 36.

The base of this modified plug valve 37' includes a stub 46' which carries a handle 47' secured thereto as by a washer nut 48. The pitch of the thread 60 is such that with the handle in one position the passageway 35' is aligned with the passageway 35, and the cone 62 is below the orifice 63 with all passageways through the shank being open, and when the handle is rotated substantially but not quite a full turn, 360 degrees, the passageway 35' is again substantially aligned with passageway 35 and passageway 35 is open, however, the plug 37' is moved toward the orifice 63 so that the needle 62 contacts the orifice 63 to close that passageway. This rotation of the handle is controlled by a stop 64 which depends from the shank body 18' to contact one side of the handle 47' at the fully opened position and the other side of the handle 47' when the handle is rotated substantially 360 degrees. The pitch of the thread 60 may also be such that the plug may be rotated 180 degrees from one open position to another with the needle 62 moving to contact with the orifice 63 to close that passageway by the 180 degree turn. Moreover, by eliminating the stop 64 the rotation may be any multiple of a 180 degree rotation from one open position to another of the plug passageway 35' with respect to the shank passageway 35.

The handle 47' may also be rotated 90 degrees from the full open position and there, the passageway 35' is out of registration to close passageway 35 as illustrated at FIG. 11. In such position the glass gage passageway 36 is also closed because the orifice 41' is in the valve passageway 35' and no communication exists between the shank passageway 35 and the glass gage passageway 36.

I have now described my invention in considerable detail. However, it is obvious that others skilled in the art can devise and build alternate and equivalent constructions which are nevertheless within the spirit and scope of my invention. Therefore, I wish my protection to be limited, not by the constructions herein illustrated and described, but only by the proper scope of the appended claims.

I claim:

1. A valved T-shaped urn shank adapted to be mounted at the base of an urn to outstand therefrom and to hold a faucet and a glass gage, comprising in combination therewith, a T-shaped member having opposing aligned arms and a central leg outstanding therefrom with communicating passageways through the arms and the leg with one arm being connected to the urn, the other arm being connected to the faucet and the leg being connected with the glass gage, a valve socket traversing the arm passageway at said juncture having its axis aligned with the leg passageway, a cylindrical plug rotatably mounted in the socket having a transverse passageway therethrough in registration with the arm passageway when the plug is rotated to a first open position and to a second open position 180 degrees therefrom and to close off the arm passageways when the plug is rotated to a closed position 90 degrees from the open position, a longitudinal passageway through the end of the plug completely offset from the plug axis and extending from the transverse passageway to the leg passageway, a block in the leg passageway including an orifice therethrough and cut-off means associated with the plug adapted to provide communication through the longitudinal passageway and block orifice when the plug is at one open position and to close off such communication when the plug is rotated to another open position.

2. In the combination defined in claim 1, said plug including a flattened end abutting against said block with the block-orifice being offset to register with the longitudinal passageway through the plug when the plug is at said first open position but out of registration with the longitudinal passageway when the plug is at said second open position.

3. A valved, T-shaped urn shank adapted to be mounted at the base of an urn to outstand therefrom and to hold a faucet and glass gage, and comprising a T-shaped body having opposing aligned arms and a central leg outstanding between the arms, and with communicating passageways through the arms and the leg, with one arm being adapted for connection to the urn, the other arm being adapted for connection to the glass gauge, said body including a valve socket traversing the arm passageways at the juncture with the leg with its axis being in substantial alignment with the leg passageway and a block in the leg passageway at the bottom of the valve socket, a cylindrical plug rotatably mounted in the socket, with its end being held against the block at the bottom of the valve socket, said plug having a transverse passageway therethrough in registration with the arm passageways with the plug being at a first open position and at a second open position when rotated 180 degrees from said first open position, and a longitudinal passageway from the transverse passageway and through the end thereof with the longitudinal passageway and opening being completely offset from the socket axis and an orifice through said block which is in registration with the longitudinal passageway end opening when the plug is at the first said open position but out of registration with the passageway when the plug is at second said open position.

4. In the combination defined in claim 1, wherein the orifice through said block is axially centered with respect to the valve socket and wherein said cut-off means to provide communication through the longitudinal passageway and block orifice when the plug is rotated, to another open position, includes, a threaded connection means between the valve socket and the plug adapted to shift the plug axially towards the block responsive to the plug rotation and an axially centered closure needle at the end of the plug adjacent to the block orifice adapted to contact with and close the block orifice when the plug is shifted towards the block by rotation thereof.

References Cited in the file of this patent

UNITED STATES PATENTS

| | | |
|---|---|---|
| 558,708 | Baldwin | Apr. 21, 1896 |
| 621,928 | Libbey | Mar. 28, 1899 |
| 1,183,544 | Dittrich | May 16, 1916 |
| 1,602,722 | Sturdivant | Oct. 12, 1926 |
| 1,849,259 | Walker | Mar. 15, 1932 |